Patented Oct. 7, 1952

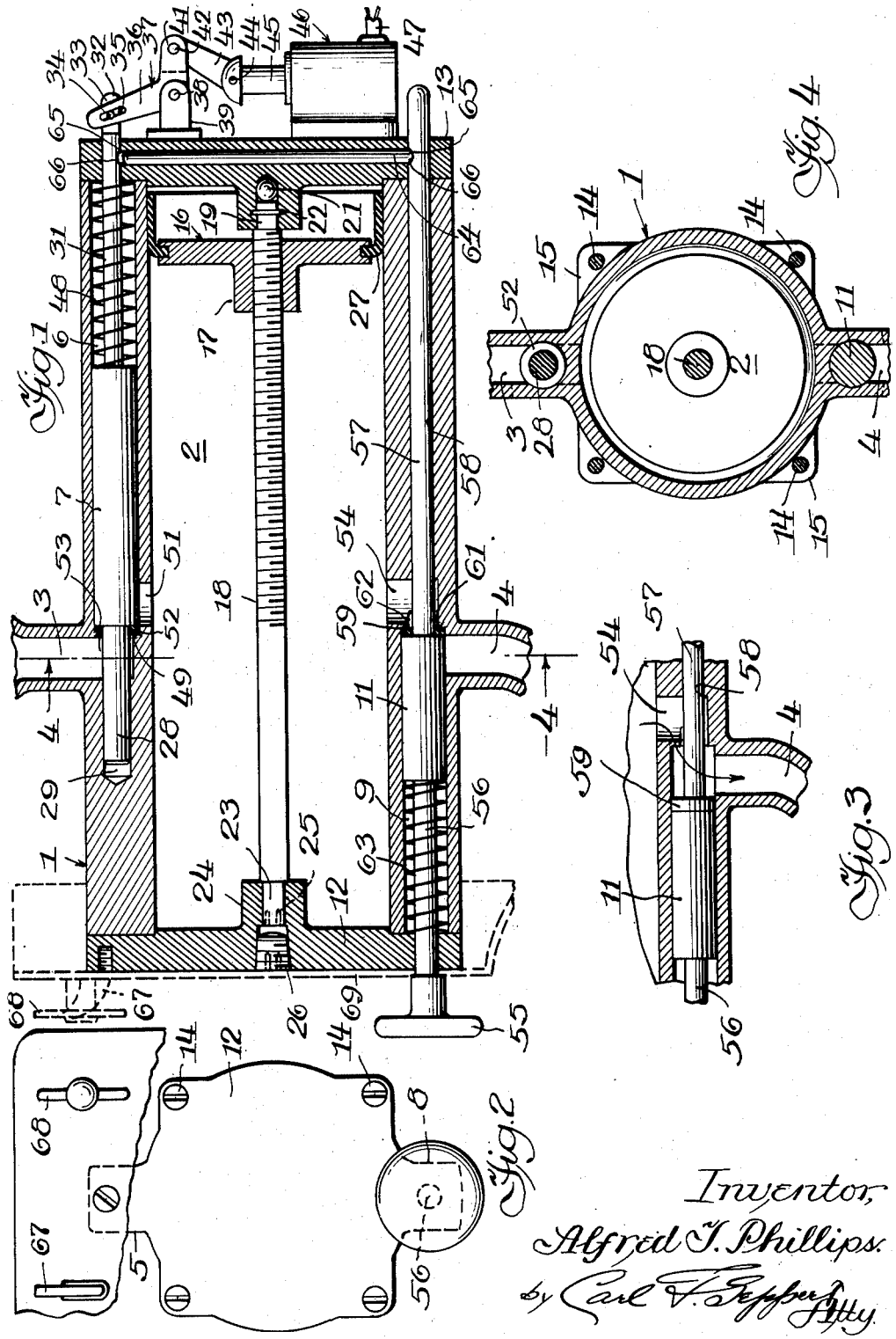

2,613,017

UNITED STATES PATENT OFFICE 2,613,017

DISPENSING DEVICE AND VALVE ASSEMBLY THEREFOR

Alfred T. Phillips, Chicago, Ill., assignor to National Packaging Machinery Repair Co., Chicago, Ill., a corporation of Illinois Application September 8, 1949, Serial No. 114,643

4 Claims. (Cl. 222—440)

The present invention relates to dispensing devices and more particularly to a novel dispensing device and valve assembly for dispensing a predetermined quantity of liquid.

Among the objects of the present invention is the provision of a novel dispensing device for accurately measuring and dispensing such measured quantity of liquid.

The present invention further comprehends the provision of a novel valve assembly for dispensing a predetermined, measured quantity of liquid. In its preferred embodiment the operation of the present novel dispensing device is initiated by depositing a coin which energizes a solenoid actuating a valve controlling the flow of liquid or fluid to a measured chamber of the device. Upon such completed cycle the operator by manually manipulating a plunger controls a second valve by which he dispenses or discharges the measured quantity of liquid into a cup or other receptacle or container provided for receiving the liquid being dispensed.

The invention further comprehends the provision of a novel safety feature comprising an interlock between the pair of control valves whereby when the valve controlling the flow into the measured chamber is open, the operator cannot open the valve controlling the discharge from this chamber and when the operator has withdrawn the plunger to open the valve controlling the dispensing of a measured quantity of liquid, the valve controlling the flow into the chamber is incapable of being opened, whereby to assure the continued dispensing of equal, measured quantities of liquid each time the dispensing device is operated.

A further object of the present invention is the provision of a novel liquid or fluid measuring device so constructed and arranged as to be adjustable whereby the capacity of the measuring chamber and the measured quantity of liquid to be dispensed may be altered.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in vertical cross-section taken longitudinally through the housing and dispensing valve assembly and showing the valve members and associated mechanism in closed or inoperative position.

Fig. 2 is a fragmentary view in front elevation of the dispensing device.

Fig. 3 is a fragmentary view of Fig. 1 but showing the dispensing valve and discharging ports in open or retracted position.

Fig. 4 is a view in vertical and transverse section taken in a plane represented by the line 4—4 of Fig. 1.

Referring more particularly to the novel illustrative embodiment disclosed in the drawing, there is shown a dispensing device and valve assembly therefor comprising a housing 1 having a substantially cylindrical inner chamber 2 for receiving a measured quantity of liquid entering through the inlet 3 and discharged or dispensed through an outlet 4.

The exterior of the housing is provided with an offset 5 at its upper surface cored to provide a cylindrical bore 6 adapted to slidably receive a valve plunger 7 controlling the passage of the liquid through the inlet 3, and an offset 8 at its lower surface cored to provide a cylindrical bore 9 adapted to slidably receive a valve plunger 11 controlling the discharge through the outlet port 4. A plate 12 at the front and a plate 13 at the rear provide end closures for the opposite ends of the housing. These may be secured to the housing by bolts or other suitable attaching means 14 received in threaded lugs or embossments 15 on the housing.

Although the chamber or receptacle 2 in the housing may be formed of any desired capacity, the present invention comprehends providing it with an adjustable partition whereby the capacity may be varied by the operator if the quantity of liquid or any suitable beverage to be dispensed is to be altered. This partition may comprise a plate or disc 16 having an internally threaded hub 17 longitudinally adjustable on a threaded stem or tie rod 18. This stem or shaft has its inner end 19 reduced and journalled in a hub of the rear end plate 13 and against a ball or thrust bearing 21, the inner end being locked in place against longitudinal movement by a split ring 22. The opposite or outer reduced end 23 of the stem or tie rod 18 is journalled in the hub 24 of the front or end plate 12, with the end 23 being notched or recessed at 25 to receive a suitable tool for rotating the threaded shaft or tie rod and thereby longitudinally adjusting the partition or disc 16 along the threaded portion of the stem to control the capacity of the chamber 2. However, to prevent unintentional adjustment, access to the stem or tie rod 18 can only be secured by removal of a threaded plug 26. To assure against leakage about the partition, the disc or plate 16 is provided with a sealing washer 27 having wiping and sealing contact with the interior cylindrical wall of the chamber whereby to prevent leakage of the liquid to the rear of this partition.

The valve plunger 7 is reduced at its forward end to provide an aligning and guiding projection 28 slidably and conformably received in a reduced bore 29 in alignment with the bore 6 and providing a guide for the sliding or longitudinal movement of the valve plunger. At its rear this valve plunger 7 is formed with a reduced cross-section providing valve stem 31 with its outer end 32 projecting through an opening in the end or rear plate 13 and its extreme end provided with a flat surface 33 and pin 34 projecting laterally therefrom. This pin is received in an elongated slot 35 in a crank-arm 36 of a bell-crank 37 pivotally mounted at 38 upon a bracket 39 secured upon the exterior of the end or rear plate 13.

The outer end of the arm 41 of the bell-crank is pivotally connected at 42 to an arm 43 which in turn is pivotally connected at 44 to the upper or outer end of a core 45 of a solenoid 46, the latter being energized from any suitable source of electricity through the cord 47. Energizing this solenoid retracts its core and causes the bell-crank 37 to withdraw or move the valve plunger 7 rearwardly or to the right as viewed in Fig. 1, against the action of a spring 48 encompassing the valve stem 31 and bearing at one end against the rear of the plunger 7 and at its other end against the interior of the end plate 13. Thus the plunger is spring-biased to closed position against a shoulder 49 at the forward end of the bore 6 and in which position the valve plunger overlies and closes a port 51 opening into the chamber 2. To seal against leakage, a sealing washer 52 is preferably press-fitted and carried on the forward end 28 of the valve plunger against the shoulder 53 of this plunger. Thus when the solenoid is de-energized, the spring 48 automatically closes the valve plunger 7.

The valve plunger 11 controls the discharge through a port 54 on the interior wall of the chamber 2 and opening into the outlet 4 when this valve plunger is withdrawn by the operator by pulling outwardly on a knob or handle 55 on the end of a valve stem 56. Like the valve plunger 7, this valve plunger 11 is provided at its rear with a stepped reduction forming a projection 57 conformably received and slidably mounted in a bore 58 aligned with the bore 9 and a sealing washer 59 is press-fitted onto this reduction and against the shoulder 61 on the plunger. When the valve plunger 11 is retracted to closed position as shown in Fig. 1, the sealing washer 59 abuts and seals against a shoulder 62 defining the reduction between the bore 9 and the reduced bore 59. A spring 63 automatically retracts the valve plunger 11 whereby to close the outlet 4 to port 54 immediately upon the operator releasing the knob or handle 55.

To prevent the knob 55 and valve plunger 11 from being withdrawn to uncover the outlet 4 and open the port 54 to discharge when the valve plunger 7 is withdrawn to uncover the port 51 and permit passage from the inlet 3 through this port 51 to the interior of the chamber 2, there is provided a safety interlock comprising a transverse pin or rod 64 forming a detent longitudinally movable or slidable in a bore in the rear or end plate 13. This pin or rod has its opposite ends 65 rounded and each adapted to be received in a complementary notch or recess 66 provided in the valve stem 31 of the valve plunger 7 and in the projection 57 of the valve plunger 11.

As appears from Fig. 1 and assuming liquid from a suitable receptacle disposed above the inlet 3 and which may contain any beverage, hot or cold, which is suitable for dispensing in this manner, has entered and fills the chamber 2 and with the valve plunger 7 returned to its closed position upon deenergization of the solenoid 46, it will be apparent that the knob 55 and valve plunger 11 may now be withdrawn against the tension of the spring 63. Upon such withdrawal, the lower end 65 of the pin or rod 64 can ride out of its recess 66 in the projection 57 and seat in the then aligned recess 66 in the valve stem 31. Thus the latter and its valve plunger 7 are locked or held against longitudinal movement and no liquid may enter through the inlet 3 and its intake port 51 into the chamber 2 of the housing. Similarly, if the valve plunger 7 is withdrawn or moved rearwardly or to the left from the position shown in Fig. 1 by energizing the solenoid 46 which depresses its core 45 and actuates the bell-crank 37 and in which position liquid flows into the chamber 2, in such position and during such filling operation the knob 55 and its valve plunger 11 for discharging the liquid contained in the chamber 2 cannot be withdrawn. This is prevented as such movement of the plunger 7 depresses the pin or rod 64 and the lower end 65 thereof is forced into the notch or recess 66 in the projection 57 whereby the valve plunger 11 is locked or held against movement until the filling is completed, the solenoid is deenergized and the spring 48 moves the valve plunger 7 to its normally closed position.

Energizing the solenoid to retract the valve plunger 7 and thereby open the inlet port 51 to the chamber 2, is preferably accomplished by the insertion of a coin into a slot 67 and the turning of a handle 68 disposed on a face plate 69 at the front of the housing. The solenoid remains energized until the chamber is filled with the measured quantity of liquid, whereupon the operator may withdraw the knob or handle 55 to discharge the contents of the chamber into a cup or other receptacle. Any suitable mechanism for opening the circuit to the solenoid when the chamber is filled may be employed.

Having thus disclosed the invention, I claim:

1. A liquid dispensing device and valve assembly therefor comprising a housing having a chamber of predetermined capacity for dispensing a measured quantity of liquid and spaced bores in the housing extending longitudinally thereof, an inlet controlling passage to the chamber and an outlet controlling discharge therefrom, a reciprocatory valve member in one bore for controlling the passage through the inlet and a reciprocatory valve member in the other bore for controlling discharge from the outlet and each of said valve members being spring-biased to closed position and located outside the liquid chamber, means operated upon insertion of a coin for moving the valve member controlling the inlet to open position to permit the passage through the inlet and into the chamber of a quantity of liquid to fill said chamber, and manually operated means operable only when the inlet valve member is moved to and locked in closed position for moving the valve member controlling the outlet to open position to permit discharge and emptying of the chamber.

2. A liquid dispensing device adapted to be connected to a beverage container for successively dispensing a predetermined quantity of the beverage, comprising a housing adapted to be connected to the container and having a chamber for receiving a measured quantity of the beverage to be dispensed into a cup or other receptacle and bores extending longitudinally of said housing and spaced from the beverage chamber, means for adjusting the capacity of said chamber, an inlet opening into said chamber intermediate its ends and connected to the beverage container and an outlet from said chamber intermediate its ends for discharging the contents into the receptacle, a valve including a valve member movable in one of said bores longitudinally of said housing for controlling the inlet to the chamber, a valve including a valve member movable in the other of said bores longitudinally of the housing for controlling the outlet therefrom and the discharge of the contents, a coin-actuated solenoid for operating the inlet valve whereby the liquid flows from the container into and fills the chamber, manually-operated means for opening the valve controlling the discharge from the outlet, and a safety interlock including a member extending transversely of the housing and between the valve members to prevent simultaneous operation of the valves.

3. A liquid dispensing device comprising a housing provided with a chamber for dispensing a measured quantity of liquid and bores extending longitudinally of said housing and spaced from the chamber in the upper and lower part of the housing, means for adjusting the capacity of said container, an inlet valve assembly mounted in the bore in the upper part of the housing and an outlet valve assembly mounted in the bore in the lower part of the housing for controlling the inlet to and the outlet from the chamber, each valve assembly including a slidable valve member movable in its bore longitudinally of the housing and spring-biased to closed position, power-actuated mechanism for operating the valve member controlling passage through the inlet, manually-actuated means for operating the valve member controlling passage through the outlet, and interlocking means in the end wall of the housing connecting said valve members and including a transverse member actuated by movement of either valve member for engaging the other valve member and thereby prevent opening of one valve when the other valve is open.

4. A liquid dispensing device and valve assembly therefor comprising a housing having a chamber of predetermined capacity for dispensing a measured quantity of liquid and a pair of bores spaced from the chamber, an adjustable partition in the chamber for varying its capacity, an inlet controlling passage to the chamber and an outlet controlling discharge therefrom, separate valve members each mounted in a bore in the housing and spaced from the chamber for controlling the passage of liquid through the inlet into the chamber and for controlling the passage of liquid from the chamber and discharging this liquid through the outlet, said valve members each having a projection extending to one end of the housing, and a safety interlock including a transverse rod connecting the projections of said valve members to prevent opening of one while the other is opened.

ALFRED T. PHILLIPS.

REFERENCES CITED

The following references are of record in the file of this patent:

UNITED STATES PATENTS

| Number | Name | Date |
|---|---|---|
| 745,811 | Fritsche | Dec. 1, 1903 |
| 1,246,916 | Hatch | Nov. 20, 1917 |
| 1,375,430 | Walker | Apr. 19, 1921 |
| 1,594,367 | Heron | Aug. 3, 1926 |
| 1,879,129 | DeVinney | Sept. 27, 1932 |